(12) United States Patent
Howe

(10) Patent No.: US 7,996,006 B2
(45) Date of Patent: *Aug. 9, 2011

(54) WIRELESS MOBILE CALL LOCATION AND DELIVERY FOR NON-GEOGRAPHIC NUMBERS USING A WIRELINE SSP+SCP/WIRELESS HLR INTERFACE

(75) Inventor: Walter Wesley Howe, Alpharetta, GA (US)

(73) Assignee: GTE Wireless Incorporated, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/931,637

(22) Filed: Oct. 31, 2007

(65) Prior Publication Data

US 2008/0057965 A1  Mar. 6, 2008

Related U.S. Application Data

(63) Continuation of application No. 11/141,173, filed on May 31, 2005, now Pat. No. 7,353,022, which is a continuation of application No. 09/577,329, filed on May 24, 2000, now Pat. No. 6,909,900, which is a continuation-in-part of application No. 09/487,844, filed on Jan. 19, 2000, now Pat. No. 6,757,538, which is a continuation-in-part of application No. 09/340,508, filed on Jul. 1, 1999, now Pat. No. 6,487,412.

(51) Int. Cl.
*H04W 4/00* (2009.01)
(52) U.S. Cl. ............... 455/432.3; 455/432.1; 455/435.1; 455/439; 455/445
(58) Field of Classification Search .................. 455/445, 455/432.1, 432.3, 435.1, 439, 432, 1; 379/220, 379/207
See application file for complete search history.

(56) References Cited

U.S. PATENT DOCUMENTS

| | | | |
|---|---|---|---|
| 5,210,786 A | 5/1993 | Itoh | |
| 5,241,598 A | 8/1993 | Raith | |
| 5,315,636 A | 5/1994 | Patel | |
| 5,400,338 A | 3/1995 | Flammer | |
| 5,572,528 A | 11/1996 | Shuen | |
| 5,636,209 A | 6/1997 | Perlman | |
| 5,680,440 A | 10/1997 | Ghisler et al. | |
| 5,703,939 A | 12/1997 | Bushnell | |
| 5,724,658 A | 3/1998 | Hasan | |
| 5,758,281 A | 5/1998 | Emery et al. | |
| 5,790,638 A * | 8/1998 | Bertacchi | 379/88.26 |
| 5,815,561 A | 9/1998 | Nguyen et al. | |

(Continued)

*Primary Examiner* — Nghi H Ly

(57) ABSTRACT

A system and method is provided for establishing a call to a wireless directory number (982) which is either a non-geographic directory number or a non-dialable directory number. A call is initiated from a wireline telephone (155) to a geographic-based local access directory number (994, 996). An originating switching node (810) recognizes the local access directory number (994, 996) as an AIN trigger, and thereafter identifies a signaling node (820) that is associated with the dialed local access DN (994, 996). The signaling node (820) sends a location request that includes the local access DN (994, 996) to an HLR (130). The HLR (130) obtains the wireless DN (982) from an internal database (990) in which the wireless DN (982) is associated with the local access DN (994, 996). The HLR (130) utilizes the wireless DN (982) to receive a temporary local directory number (TLDN) from visitor location register (140). The HLR (130) associates the TLDN with the local access DN (994, 996) and subsequently forwards the TLDN to the signaling node (820), which in turn relays the TLDN to the originating switching node (810). The call connection is thereafter established directly from the originating switching node in the end office to a visited cellular switch using the TLDN.

12 Claims, 9 Drawing Sheets

U.S. PATENT DOCUMENTS

| | | |
|---|---|---|
| 5,842,126 A | 11/1998 | Sawyer et al. |
| 5,878,348 A | 3/1999 | Foti |
| 5,889,774 A | 3/1999 | Mirashrafi et al. |
| 5,901,359 A | 5/1999 | Malmstrom |
| 5,903,833 A | 5/1999 | Jonsson et al. |
| 5,915,222 A | 6/1999 | Olsson et al. |
| 5,924,035 A | 7/1999 | Joensuu |
| 5,943,620 A | 8/1999 | Boltz et al. |
| 5,978,677 A | 11/1999 | Sawyer |
| 5,991,621 A | 11/1999 | Alperovich |
| 6,002,759 A | 12/1999 | Kallioniemi et al. |
| 6,006,094 A | 12/1999 | Lee |
| 6,021,126 A | 2/2000 | White et al. |
| 6,044,261 A | 3/2000 | Kazmi |
| 6,044,274 A | 3/2000 | Vo et al. |
| 6,075,783 A | 6/2000 | Voit |
| 6,078,575 A | 6/2000 | Dommety et al. |
| 6,097,801 A | 8/2000 | Williams et al. |
| 6,125,126 A | 9/2000 | Hallenstal |
| 6,173,157 B1 * | 1/2001 | Godoroja et al. ............ 340/7.41 |
| 6,259,782 B1 | 7/2001 | Gallant |
| 6,259,783 B1 | 7/2001 | Tewani et al. |
| 6,259,914 B1 | 7/2001 | Koster |
| 6,330,448 B1 * | 12/2001 | Otsuka et al. ................. 455/436 |
| 6,356,756 B1 | 3/2002 | Koster |
| 6,363,253 B1 | 3/2002 | Valentine et al. |
| 6,408,181 B1 | 6/2002 | Ho |
| 6,434,126 B1 * | 8/2002 | Park ............................ 370/328 |
| 6,463,270 B1 | 10/2002 | Chang et al. |
| 6,466,571 B1 | 10/2002 | Dynarski et al. |
| 6,473,411 B1 | 10/2002 | Kumaki et al. |
| 6,526,033 B1 | 2/2003 | Wang et al. |
| 6,532,490 B1 | 3/2003 | Lewis et al. |
| 6,560,458 B1 * | 5/2003 | Ronkko ....................... 455/445 |
| 6,574,216 B1 | 6/2003 | Farris et al. |
| 6,671,506 B1 | 12/2003 | Lee |
| 6,693,894 B1 | 2/2004 | Andersson et al. |
| 7,353,022 B2 * | 4/2008 | Howe ......................... 455/432.3 |
| 2003/0039237 A1 | 2/2003 | Forslow |
| 2008/0051082 A1* | 2/2008 | Howe ........................... 455/433 |
| 2008/0057965 A1 | 3/2008 | Howe |

* cited by examiner

US 7,996,006 B2

WIRELESS MOBILE CALL LOCATION AND DELIVERY FOR NON-GEOGRAPHIC NUMBERS USING A WIRELINE SSP+SCP/WIRELESS HLR INTERFACE

CROSS REFERENCE TO RELATED APPLICATIONS

This application is a continuation of U.S. application Ser. No. 11/141,173, filed May 31, 2005, now U.S. Pat. No. 7,353,022 which is a continuation of U.S. application Ser. No. 09/577,329, filed May 24, 2000, now U.S. Pat. No. 6,909,900, which is a continuation-in-part of U.S. application Ser. No. 09/487,844, filed Jan. 19, 2000, now U.S. Pat. No. 6,757,538, which is a continuation-in-part of U.S. application Ser. No. 09/340,508, filed Jul. 1, 1999, now U.S. Pat. No. 6,487,412, each assigned to the common assignee of the present invention and all of which are hereby incorporated herein in their entirety by reference.

BACKGROUND OF THE INVENTION

1. Field of the Invention

The present invention relates to telecommunication networks and, more particularly, to a method and system for routing calls directed to non-geographic wireless directory numbers in a telecommunications network.

2. Background of the Art

In known telecommunications networks, a wireline telephone number or directory number (DN) is associated with a fixed geographic location and is served by a single wireline switch. In a wireless network, however, a wireless DN is associated with multiple geographic locations and is served by any one of a number of wireless switches depending on the specific geographic location of the associated mobile wireless device (hereinafter mobile wireless station or wireless station) at the time a call is made. This portability of a wireless DN is one of the basic attributes of wireless telephony, and is often referred to as "roaming".

In the present implementation of wireless networks, each mobile directory number is associated by both the wireless and wireline networks with a specific geographic home switch location. The home switch location includes a physical connectivity matrix and a stored program control section that houses the logic and algorithms necessary to control the connectivity. Associated with wireless switches is a collection of Radio Frequency (RF) channels, aggregated in multiple physical locations called cell sites across a specific area corresponding to a serving market, and variously known in the United States under the designations MSA, RSA, MTA, and BTA, depending on the FCC license.

A pair of entities known as a home location register (HLR) and visitor location register (VLR) in a telecommunications network provide seamless roaming or call delivery when a call is placed to or from a wireless DN. A home location register is associated with a home wireless switch where a wireless DN resides (i.e., the wireless switch to which all incoming wireline-originated calls to the wireless DN are directed). A mobile wireless station is located within its home area when the wireless station can directly communicate with its associated home wireless switch (i.e., located in the area covered by the home wireless switch).

A visitor location register is associated with a wireless switch currently serving a wireless station that is outside of its home area. A wireless station is outside of its home area (or roams) when the wireless station cannot directly communicate with the home wireless switch, and instead communicates with another wireless switch, which is referred to as a visited wireless switch.

Typically, when the VLR and HLR are physically in the same location, the mobile wireless station is "Home" and is not roaming. When the VLR and the HLR are not in the same location and specialized protocols are not implemented to make the wireless station act as if it were "Home", then the wireless station is "roaming".

Phone calls from a land-based terminal or station to a mobile wireless station can be completed while roaming only by a carefully orchestrated set of interactions between the HLR and VLR, all of which are described and defined by ANSI-41. ANSI-41 defines the HLR as a logically and possibly physically separate device from the actual switching matrix underlying the RF portion of the wireless network for the home location for the mobile wireless station. Similarly, the VLR is defined as a logically and possibly physically separate device from the actual switching matrix underlying the RF portion of the wireless network from which a mobile wireless station is currently being served. This physical separation, together with the Signaling System Seven (SS7) and the associate messages and protocols, are existing underlying components utilized by the invention.

One problem with known telecommunication networks is that two connections must be established when a call is placed to a wireless DN whose associated wireless station is outside of its home area. In such instances, the telecommunications network first establishes a connection to the home wireless switch associated with the wireless DN. That is, in the existing art, the wireline station call is first routed from the serving wireline switch to the home wireless switch (the HLR location), possibly by way of additional local or Inter-Exchange Carrier (IXC) switches. The home wireless switch then establishes a second connection to a visited wireless switch that currently serves the wireless DN. In particular, the HLR interacts with the VLR to obtain a Temporary Local Directory Number (TLDN) from the allocations made for the physical location of the visited wireless switch serving the wireless station. The wireless switch containing the HLR routes the call via the public switched telephone network (PSTN) to the wireless switch containing the VLR, which then establishes the necessary wireless RF connection to the mobile wireless station. Thus, two separate PSTN connections must be made to complete a single land-to-mobile call while roaming.

As an illustration, FIG. 1 shows a block diagram of a conventional telecommunications network 100. Telecommunications network 100 comprises a wireline switch 110, a home wireless switch 120, a home location register 130, a signal transfer point (STP) 135, a visitor location register 140, a visited wireless switch 150, a wireline telephone 155, a cell site including antenna 170, and a wireless station 175.

Typically, a wireline subscriber using telephone 155 initiates a call request 180a by dialing the wireless DN associated with wireless station 175. When wireline switch 110 receives call request 180a, wireline switch 110 establishes a first connection 180b via a Public Switched Telephone Network PSTN) 160 to home wireless switch 120, which is the home switch associated with the dialed DN.

Home wireless switch 120 sends an ANSI-41 RouteRequest message 180c to its associated home location register 130, requesting the current location of wireless station 175. The text of "Interim Standard (IS) 41", Revision D, has been adopted to become the ANSI-41 standard. The IS-41, Rev. D, standard is described in "Radio Telecommunications Intersystem Operations," ANSI/TIA/EIA/41-D-1997, which is incorporated herein by reference. The ANSI-41 Standard describes the communication protocol between home wireless switch 120, home location register 130, visitor location register 140, and visited wireless switch 150 in telecommunications network 100. It should be understood that although the ANSI-41 standard is referred to herein, the features and capabilities of IS-41 Revision A have been found sufficient to enable the present invention.

If wireless station 175 is outside of its home area, as shown in FIG. 1, home location register 130 then identifies the visitor location register with which wireless station 175 was last registered, for example, visitor location register 140, and sends an ANSI-41 RouteRequest message 180d via STP 135 to visitor location register 140.

Visitor location register 140 forwards RouteRequest message 180d to its associated visited wireless switch 150, requesting a route to wireless station 175. Visited wireless switch 150 computes a temporary local directory number (TLDN), which can be used in establishing incoming calls to wireless station 175. Visited wireless switch 150 then returns the TLDN to visitor location register 140 in an ANSI-41 message 180e. Visitor location register 140 then sends, via STP 135, to home location register 130, an ANSI-41 RouteRequest response message 180f that includes the TLDN.

Home location register 130 forwards RouteRequest response message 180f to home wireless switch 120. Using the TLDN in RouteRequest response message 180f, home wireless switch 130 then establishes a second connection 180g to visited wireless switch 150, which sends a ring signal to wireless station 175. Thus, to establish a call between telephone 155 and wireless station 175 when wireless station 175 is outside of its home area, telecommunications network 100 must establish two separate connections 180b and 180g.

Another problem with conventional methods of routing land-to-mobile calls is that they are dependent on a known geographic "home" for the wireless DN in the home wireless switch. That is, certain directory numbers cannot be used as wireless DN's using the conventional approach shown in FIG. 1. These directory numbers include non-geographic numbers (e.g., NANP directory numbers to which no geographic territory has been assigned) and/or non-dialable numbers (e.g., directory numbers not provided for under the NANP). This unavailability is because such numbers are not routable under conventional approaches, inasmuch as they have no geographic endpoint (i.e., there is no "home" wireless switch for a non-geographic directory numbers). This unavailability reduces the capacity of the telecommunications network, as well as its efficiency.

In addition, another problem arises with conventional methods of routing land-to-mobile calls. With conventional methods, a wireless mobile station is assigned to a single home area. Accordingly, land-to-mobile calls that are originated outside of the home area are long distance calls. These long distance calls are subject to higher billing rates, which may discourage potential callers from dialing the wireless mobile station. In a scenario in which these potential callers are business associates or clients who are located in regions outside of the subscriber's home area, the higher billing rates may undesirably inhibit growth of the subscriber's client base or may result in a loss of some business associates or clients because the business associates or clients do not wish to place long distance calls.

Accordingly, there is a need for a method and system for establishing land-to-mobile calls that minimizes or eliminates one or more problems as set forth above.

SUMMARY OF THE INVENTION

An advantage of the present invention is that a method and a system are provided that reduce the number of connections that must be established in a telecommunications network when making a call from a land telecommunications terminal to a wireless mobile station.

Another advantage of the present invention is that the method and system increase network capacity and efficiency by enabling use of non-geographic and non-dialable directory numbers for wireless stations that would otherwise go unused.

It is yet another advantage of the present invention that the method and system allow a wireless mobile station to have multiple local directory numbers each associated with a different geographic location.

The above and other advantages of the present invention are carried out in one form by a method for establishing a call to a wireless directory number (DN) associated with a wireless mobile station, the wireless DN being one of a non-geographic DN and a non-dialable DN. The method calls for receiving a local access DN at an originating switching node and identifying a signaling node associated with the local access DN. The method further calls for obtaining, from a database residing at a home location register, the wireless DN associated with the local access DN, utilizing the wireless DN to determine a route that includes the originating switching node and a visited switching node serving the wireless DN, and establishing a connection to the wireless mobile station via the determined route.

The above and other advantages of the present invention are carried out in another form by a telecommunications network which includes an originating switching node configured to determine when a local access directory number (DN) associated with a wireless mobile station has been received and to generate a routing request that includes the local access DN. A signaling node is in communication with the originating switching node. The signaling node is configured to send a location request that includes the local access DN in response to receipt of the routing request. A home location register, in communication with the signaling node, includes a database having a wireless DN associated with the local access DN, the wireless DN being one of a non-geographic DN and a non-dialable DN. The home location register is configured to access the database to obtain the wireless DN and utilize the wireless DN to obtain a temporary local directory number (TLDN) allocated to the wireless mobile station. The network further includes a visited switching node serving the wireless DN. The originating switching node is operative to establish a connection to the wireless mobile station using the TLDN via a route that includes the originating switching node and the visited switching node.

This summary and the following description of the invention should not restrict the scope of the claimed invention. Both provide examples and explanations to enable others to practice the invention.

BRIEF DESCRIPTION OF THE DRAWINGS

The accompanying drawings, which form part of the description of the invention, show several embodiments of the invention, and together with the description, explain the principles of the invention.

In the Figures.

DETAILED DESCRIPTION

The following description of embodiments of this invention refers to the accompanying drawings. Where appropriate, the same reference numbers in different drawings refer to the same or similar elements.

Methods and systems consistent with the present invention establish a single connection in a telecommunications network when connecting calls to wireless directory numbers (DNs) regardless of whether the associated wireless stations are within or outside of their respective home areas. In one embodiment, when a call is directed to a wireless DN, a wireline switch in the network identifies a signaling node associated with the wireless DN and sends the identified signaling node a request for a route to the wireless DN. If the wireless station associated with wireless DN is outside of its home area and is served by a visited node in the network, the signaling node determines a route that excludes the home node associated with the wireless DN and returns a temporary local directory number (TLDN) to the wireline switch. Using the TLDN, the wireline switch establishes a connection to the visited node, which sends a ring signal to the associated wireless station.

Figure 1:
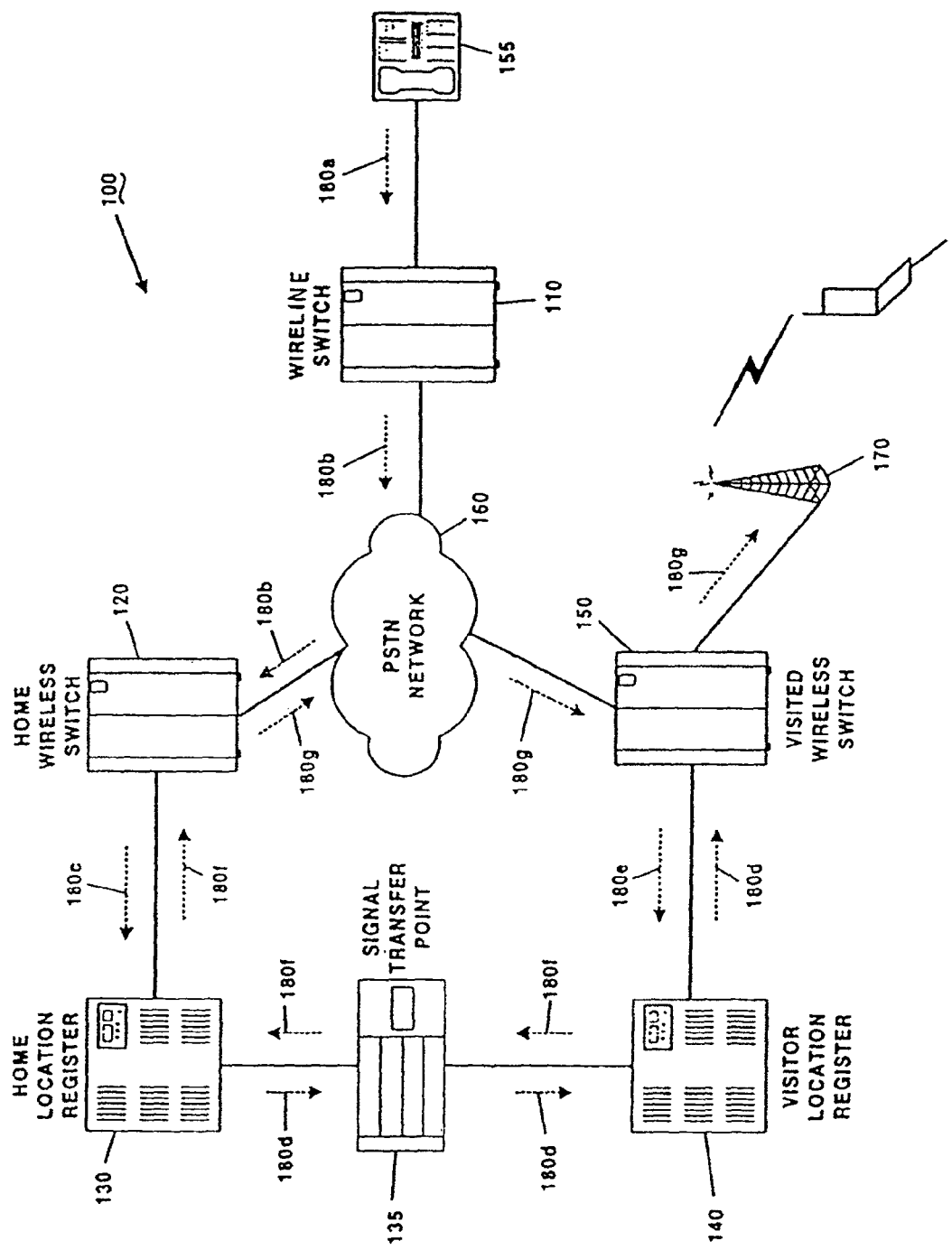
FIG. 1 is a block diagram of a conventional telecommunications network.
Figure 2:
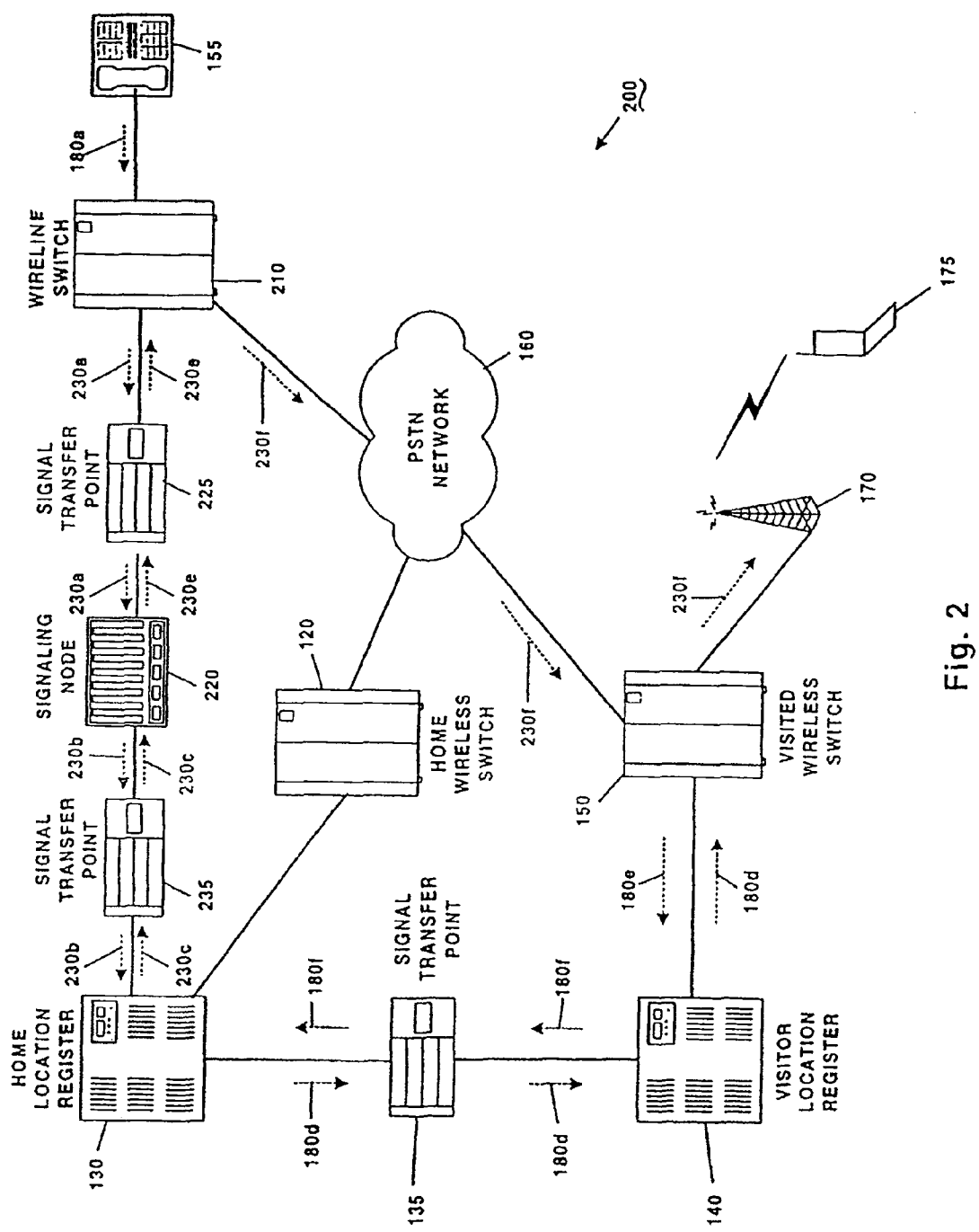
FIG. 2 is a block diagram of a telecommunications network in accordance with methods and systems consistent with the present invention.

FIG. 2 is a block diagram of a telecommunications network 200 in accordance with methods and systems consistent with the present invention. As shown, telecommunications network 200 comprises a wireline switch 210, a signaling node 220, signal transfer points (STPs) 135, 225 and 235, home wireless switch 120, home location register 130, visitor location register 140, visited wireless switch 150, a wireline station or telephone 155, cell site including antenna 170, and wireless station 175.

Wireline switch 210 connects to telephone 155 having an associated directory number, PSTN network 160, and STP 225. Wireline switch 210 may include, for example, a 5ESS™, DMS-100™ (or DMS-200™), GTD-5™, or an EWSD™ switching system manufactured by Lucent Technologies, Inc., Nortel Networks Corporation, AGCS, and Siemens, respectively. As explained below in detail, wireline switch 210 is configured to communicate with signaling node 220 when establishing incoming calls to wireless DNs, for example the wireless DN associated with wireless station 175.

Signaling node 220 interfaces home location register 130 via STP 235, which routes signaling messages in telecommunications network 200. Alternatively, signaling node 220 may interface with home location register 130 via a signaling network such as, a Signaling System 7 (SS7) network or an Internet Protocol (IP) network. Signaling node 220 may include a Service Control Point (SCP) such as, AI-NET™, Integrated Service Control Point (ISCP™) or Service Builder™ equipment/software manufactured or provided by Lucent Technologies, Inc., Telcordia Technologies, Inc., and Nortel Networks Corporation, respectively.

Home location register 130 interfaces via STP 235 with signaling node 220 and via STP 135 with visitor location register 140. Home location register 130 stores information about wireless subscribers in telecommunications network 200 such as, the current location of a wireless station associated with a subscriber, billing information, and services that the wireless subscriber is authorized to use. Visitor location register 140 stores information about the current location of a wireless station when a wireless station is activated outside of its home area. For example, in telecommunications network 200, wireless station 175 is within its home area when wireless station 175 directly communicates with home switch 120. However, wireless station 175 is outside of its home area when wireless station 175 cannot directly communicate with home wireless switch 120 and instead communicates with visited wireless switch 150. STPs 135, 225, and 235 route signaling messages such as, Advanced Intelligent Network (AIN), IS-41, ANSI-41, and SS7 messages in telecommunications network 200. Each STP 135, 225, and 235 may be an adjunct to a wireline or a wireless switch in telecommunications network 200.

Call flow processing in telecommunications network 200 will be explained in detail below with reference to FIGS. 6 and 7.

Figure 3:
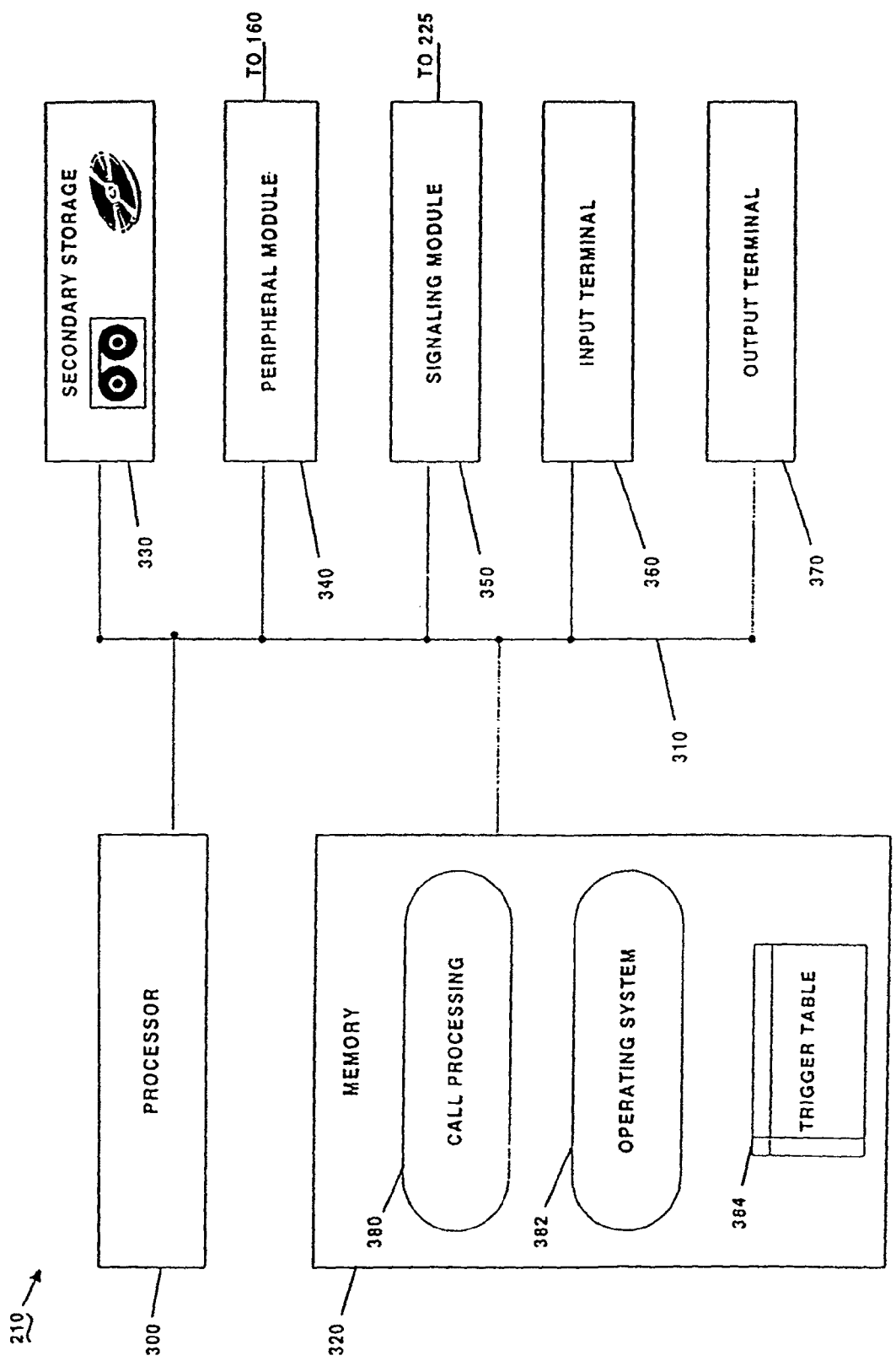
FIG. 3 is a block diagram of wireline switch in a telecommunications network in accordance with methods and systems consistent with the present invention.

FIG. 3 is a block diagram of wireline switch 210 in accordance with methods and systems consistent with the present invention. As shown, wireline switch 210 comprises a processor 300, which connects via a bus 310 to a memory 320, a secondary storage 330, a peripheral interface module 340, a signaling interface module 350, an input terminal 360, and an output terminal 370.

Memory 320 includes a call processing 380, an operating system 382, and a trigger table 384, all of which are executed by processor 300. Call processing 380 includes software and data for establishing, maintaining, and terminating calls between subscribers. Operating system 382 includes software and data for non-switching functions, which include, for example, task scheduling and processor interrupt handling. As explained below in detail, trigger table 384 includes entries that are used to intercept calls destined to wireless DNs and to identify the associated signaling nodes for routing calls to wireless DNs without establishing connections to the home wireless switches associated with the wireless DNs.

Peripheral interface module 340 interfaces with trunks that connect wireline switch 210 to PSTN network 160. The trunks carry calls, which may include, voice, data, and video, established in telecommunications network 200.

Signaling interface module 350 transmits to and receives from STP 225 signaling information such as, AIN, IS-41, and ANSI-41 messages. For example, signaling interface module 350 converts signaling information generated by call processing 380 into AIN, IS-41 or ANSI-41 messages and transmits the messages to STP 225. Likewise, signaling interface module 350 receives AIN, IS-41 or ANSI-41 messages from STP 225 and converts the messages into an internal format for processing by call processing 380.

Secondary storage 330 includes a computer readable medium such as a disk drive and a tape drive. From the tape drive, software and data may be loaded onto the disk drive, which can then be copied into memory 320. Similarly, software and data in memory 320 may be copied onto the disk drive, which can then be loaded onto the tape drive.

Input terminal 360 may include an input device such as, a keyboard, and output terminal 370 may include a display device.

Figure 4:
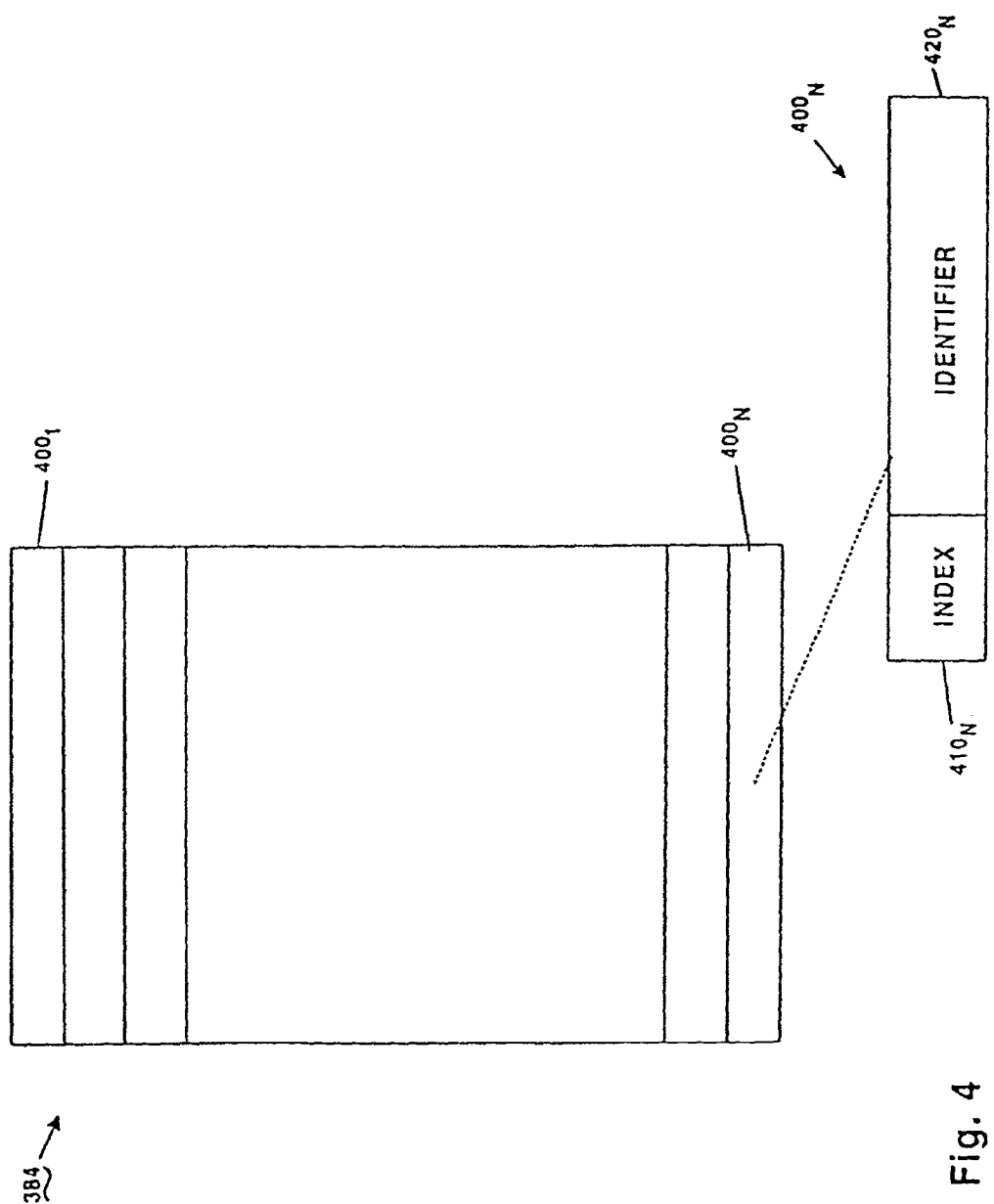
FIG. 4 is a block diagram of a trigger table in a wireline switch in accordance with methods and systems consistent with the present invention.

FIG. 4 is a block diagram of trigger table 384 in accordance with methods and systems consistent with the present invention. Trigger table 384 includes N predetermined triggers shown as entries $400_1$-$400_N$, where each entry includes an index field and an identifier field. For example, entry $400_N$ may include an index field $410_N$, and an identifier field $420_N$. In an embodiment where triggers $400_1$-$400_N$ are Public Office Dialing Plan (PODP) triggers, an index field may include a 3, 6, or 10 digit string such as, an area code, an area code and an office code, or a DN. PODP triggers are described in AIN 0.1 standards TR-NWT-001284: Advanced Intelligent Network (AIN) 0.1 Switching System Generic Requirements, Issue 1 (August 1992) and TR-NWT-001285: Advanced Intelligent Network (AIN) 0.1 Service Control Point (SCP) Application Protocol Interface Requirements, Issue 1 (August 1992), both of which are incorporated herein by reference.

Alternatively, in an embodiment where triggers $400_1$-$400_N$ are Specific Digit String (SDS) triggers, an index may include any sequence of digits. SDS triggers are described in AIN 0.2 standards GR-1298-CORE: AIN SSP, AINGR: Switching Systems (A Module Of AINGR, FR-15), Issue 4 (September 97) and GR-1299-CORE: AINGR: Switch—Service Control Point (SCP)/Adjunct Interface (A Module Of AINGR, FR-15), Issue 4 (September 97), both of which are incorporated herein by reference.

An identifier field includes a numeric string that identifies a signaling node associated with any wireless DN whose area code, area code and office code, or DN matches the associated index field in trigger table 384. For example, trigger table 384 may be configured to include a trigger entry $400_N$ where index $410_N$ includes the area code associated with the DN assigned to wireless station 175 and identifier $420_N$ includes a translation type/global title address (TT/GTA) associated with signaling node 220. The TT/GTA may then be communicated to STP 225 for determining a point code associated with signaling node 220. Alternatively, identifier $420_N$ may include a point code associated with signaling node 220, which may be used by wireline switch 210 to directly identify signaling node 220.

Figure 5:
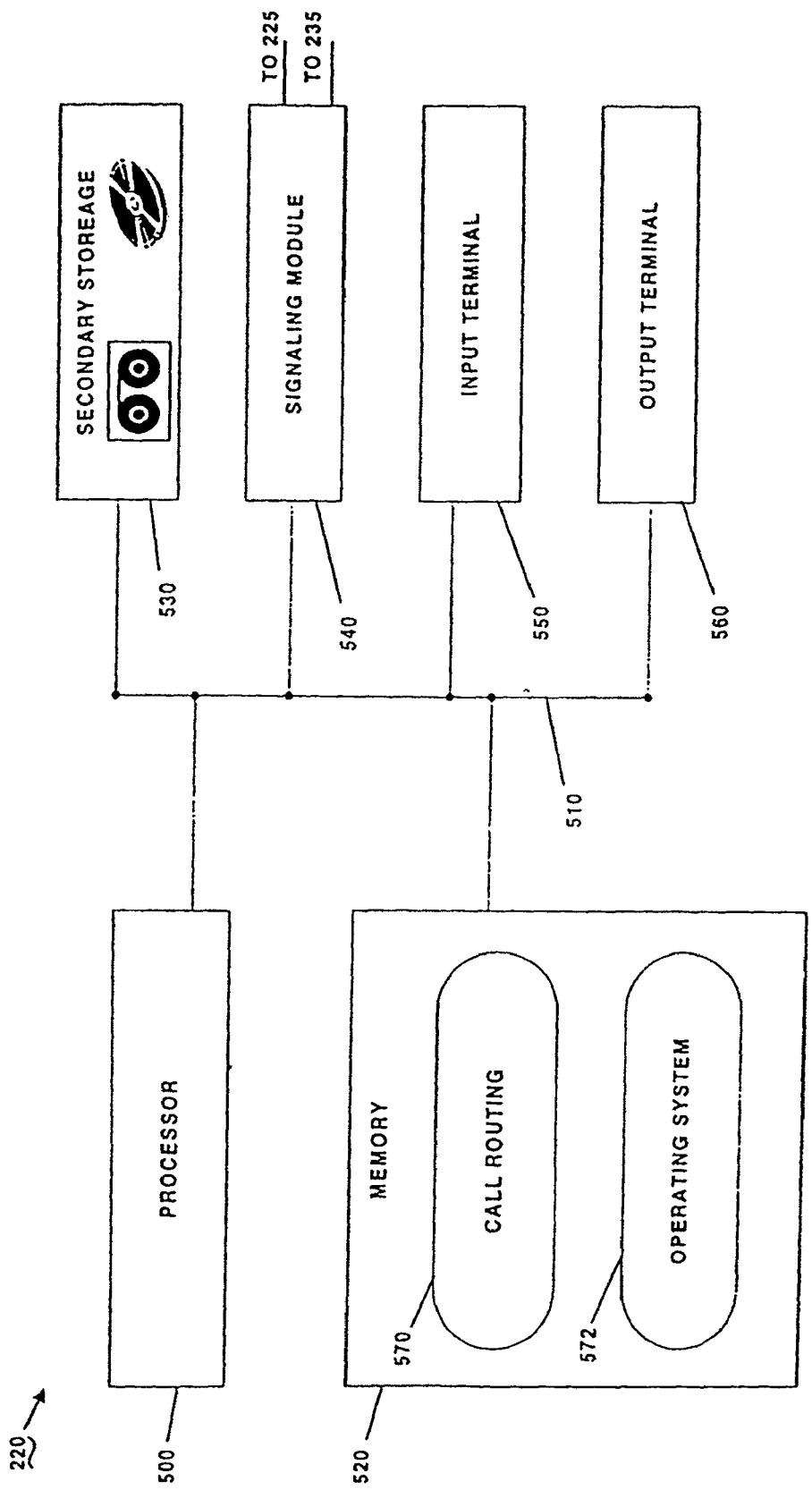
FIG. 5 is a block diagram of a signaling node in a telecommunications network in accordance with methods and systems consistent with the present invention.

FIG. 5 is a block diagram of signaling node 220 in accordance with methods and systems consistent with the present invention. Signaling node 220 comprises a processor 500, which connects via a bus 510 to a memory 520, a secondary storage 530, a signaling interface module 540, an input terminal 550, and an output terminal 560.

Memory 520 includes a call routing 570 and an operating system 572. Call routing 570 includes software and data for communicating with home location register 130 and other databases (not shown) such as, a Call Management Services Database (CMSDB), a Line Information Database (LIDB), and a Business Service Database (BSDB) in telecommunications network 200 when determining a route to a wireless DN such as, the wireless DN associated with wireless station 175.

Signaling interface module 540 transmits to and receives from STPs 225 and 235 signaling information such as, AIN, IS-41, and ANSI-41 messages. For example, signaling interface module 540 converts signaling information generated by call routing 570 into AIN, IS-41 or ANSI-41 messages and transmits the messages to STPs 225 and 235. Likewise, signaling interface module 540 receives AIN, IS-41 or ANSI-41 messages from STPs 225 and 235 and converts the messages into an internal format for processing by call routing 570.

Secondary storage 530 includes a computer readable medium such as a disk drive and a tape drive. From the tape drive, software and data may be loaded onto the disk drive, which can then be copied into memory 520. Similarly, software and data in memory 520 may be copied onto the disk drive, which can then be loaded onto the tape drive.

Input terminal 550 may include an input device such as, a keyboard, and output terminal 560 may include a display device.

Figure 6:
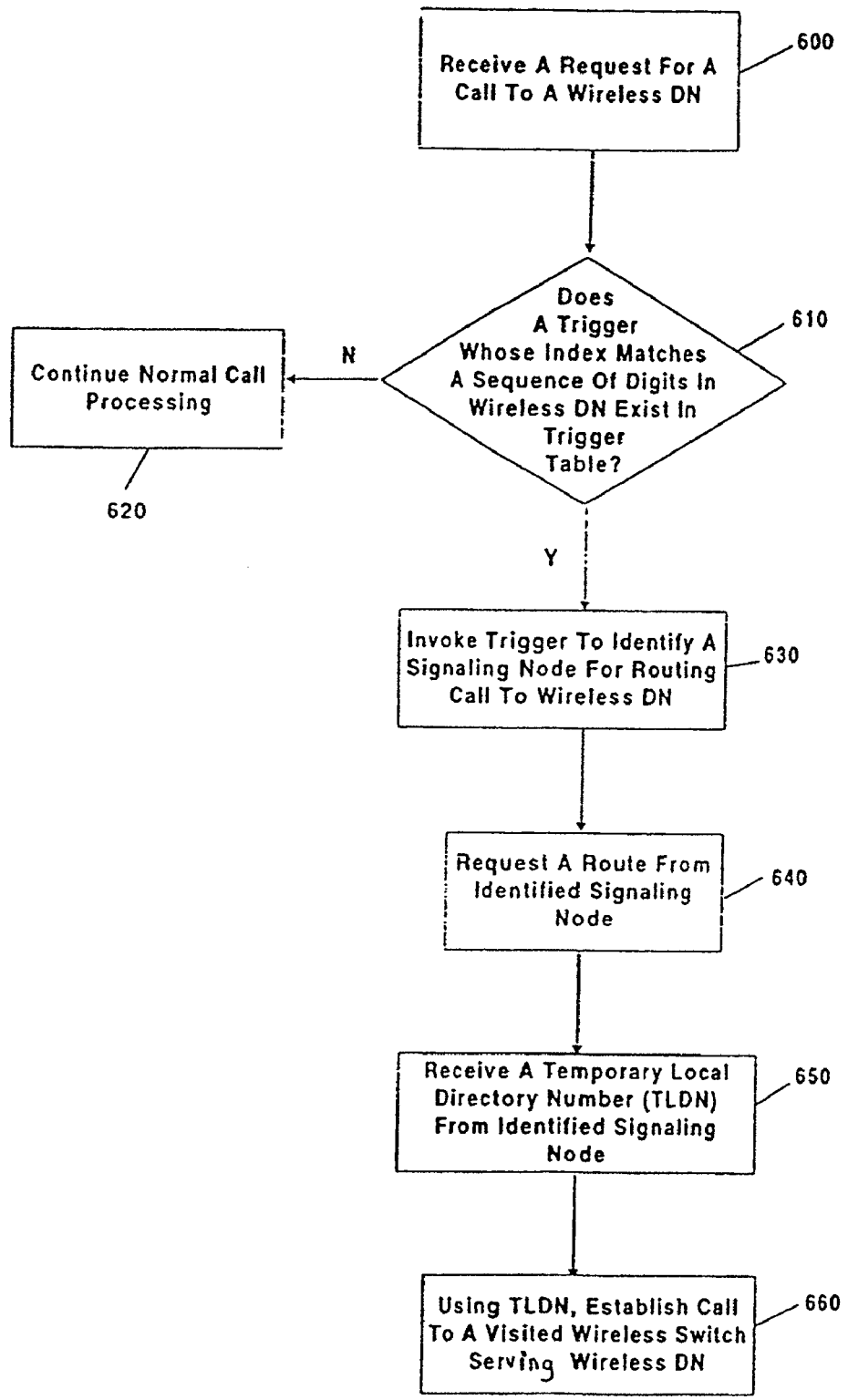
FIG. 6 is a flow chart of the steps performed by a call processing module in a wireline switch in accordance with methods and systems consistent with the present invention.

FIG. 6 is a flow chart of the steps performed by call processing 380 in wireline switch 210 when a wireline subscriber using telephone 155 originates a call to wireless station 175 in accordance with methods and systems consistent with the present invention. When the wireline subscriber dials the DN associated with wireless station 175, wireline switch 210 receives and processes a call request 180a in accordance with call processing 380 (step 600). Call processing 380 then determines whether trigger table 384 includes a trigger whose index matches a sequence of digits in the dialed DN such as, the area code, a combination of the area code and office code, or any other sequence of digits (step 610).

If call processing 380 determines that trigger table 384 does not include any triggers with a matching index, call processing 380 continues normal call processing (step 620). If trigger table 384 includes a trigger with a matching index, call processing 380 suspends normal call processing and invokes the trigger to identify a signaling node, for example signaling node 220, associated with the dialed DN (step 630).

In one embodiment, the invoked trigger includes the TT/GTA associated with signaling node 220. In this embodiment, call processing 380 then sends an AIN info-analyze message 230a via STP 225 to signaling node 220, requesting a route for establishing a call to the dialed DN (step 640). Info_analyze message 230a includes as its parameters the DN associated with the calling telephone 155 and the dialed DN associated with wireless station 175.

For example, call processing 380 may send info_analyze message 230a to STP 225 using a Signaling Connection Control Part (SCCP) message, which includes the TT/GTA associated with signaling node 220. Using the TT/GTA, STP 225 then determines from its internal tables the point code associated with signaling node 220 and forwards info_analyze message 230a to signaling node 220.

Alternatively, in another embodiment, the invoked trigger may include the point code associated with signaling node 220. In this embodiment, call processing 380 may send an AIN info_analyze message 230a directly to signaling node 220.

In response to info_analyze message 230a, if wireless station 175 is within its home area (not shown), call processing 380 receives from signaling node 220 and AIN continue response message. Call processing 380 then resumes normal call processing, and using the dialed DN, establishes a connection to home wireless switch 120, which sends a ring signal to wireless station 175.

However, if wireless station 175 is outside of its home area as shown in FIG. 2, call processing 380 receives from signaling node 220 an analyze_route message 230e, which includes a temporary local directory number (TLDN) (step 650). Call processing 380 uses the TLDN to establish a connection 230f to visited wireless switch 150, which sends a ring signal to wireless station 175 (step 660).

Accordingly, a single connection 230f is established to a single wireless switch in telecommunications network 200 when establishing a call to wireless station 175 regardless of whether wireless station 175 is within or outside of its home area. In other words, when wireless station 175 is within its home area, a single connection is established to home wireless switch 120 as explained above. Likewise, when wireless station 175 is outside of its home area as shown in FIG. 2, a single connection is established to visited wireless switch 150.

Figure 7:
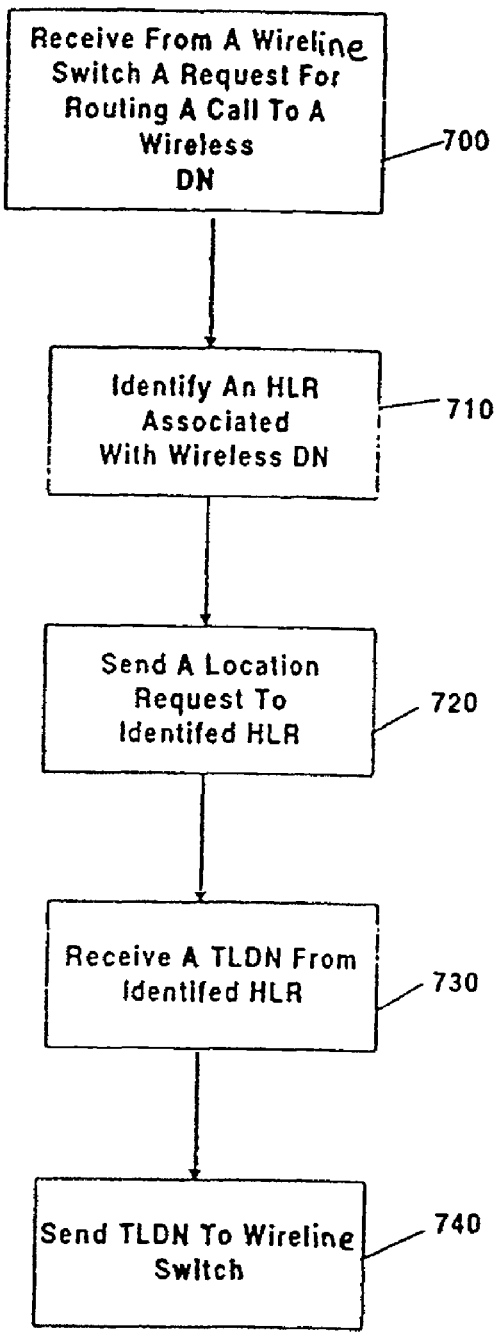
FIG. 7 is a flow chart of the steps performed by a call routing module in a signaling node in accordance with methods and systems consistent with the present invention.

FIG. 7 is a flow chart of the steps performed by call routing 570 in signaling node 220 when signaling node 220 receives from wireline switch 210 a request for routing a call to a dialed DN associated with wireless station 175 in accordance with methods and systems consistent with the present invention. When signaling node 220 receives info analyze message 230*a* from wireline switch 210 (step 700), call routing 570 identifies a home location register, for example home location register 130, associated with the dialed DN (step 710).

Call routing 570 sends an ANSI-41 LocationRequest message 230*b* via STP 235 to the identified home location register 130, requesting a route for establishing a call to the dialed DN (step 720). In response to LocationRequest message 230*b*, if wireless station 175 is within its home area, home location register 130 sends to signaling node 220 via STP 235 a LocationRequest response message that includes the dialed DN. Based on the dialed DN value in the LocationRequest response message, call routing 570 determines that wireless station 175 is within its home area and sends via STP 225 an AIN continue response message to wireline switch 210. Using the dialed DN, wireline switch 210 then establishes a connection to home wireless switch 120, which sends a ring signal to wireless station 175.

However, if wireless station 175 is outside of its home area as shown in FIG. 2, home location register 130 identifies the visitor location register, for example, visitor location register 140, with which wireless station 175 last registered, and sends an ANSI-41 RouteRequest message 180*d* via STP 135 to the identified visitor location register 140. Visitor location register 140 then forwards RouteRequest message 180*d* to its associated visited wireless switch 150, requesting a route to wireless station 175.

Visited wireless switch 150 computes a temporary local directory number (TLDN), which can be used for establishing incoming calls to wireless station 175. Visited wireless switch 150 then returns the TLDN to visitor location register 140 in an ANSI-41 message 180*e*. Visitor location register 140 then sends via STP 135 to home location register 130 an ANSI-41 RouteRequest response message 180*f* that includes the TLDN. When home location register 130 receives RouteRequest response message 180*f*, it sends via STP 235 to signaling node 220 an ANSI-41 LocationRequest response message 230*c* that includes the TLDN.

When signaling node 220 receives LocationRequest response message 230*c* from home location register 130 (step 730), call routing 570 sends analyze_route message 230*e* via STP 225 to wireline switch 210, providing wireline switch 210 with the TLDN for establishing a call to wireless station 175 (step 740). Using the TLDN, wireline switch 210 establishes a connection 230*f* to visited wireless switch 150, which sends a ring signal to wireless station 175. Accordingly, only a single connection 230*f* is established to a single wireless switch (i.e., visited wireless switch 150) in telecommunications network 200 when establishing a call to wireless station 175 while wireless station 175 is outside of its home area.

Two-Stage Dialing

Figure 8:
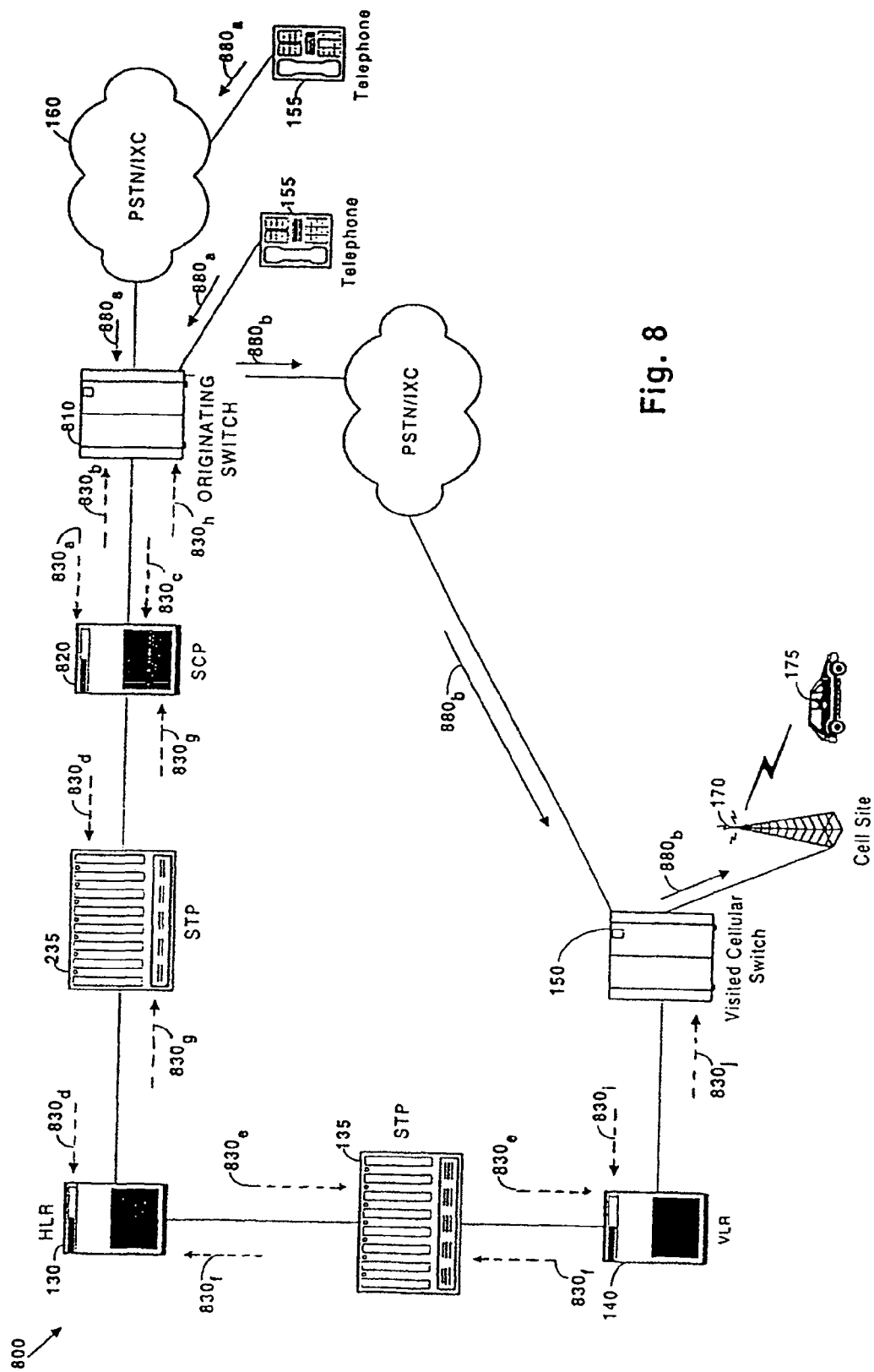
FIG. 8 is a block diagram of a telecommunications network in accordance with a further two-stage dialing embodiment consistent with the present invention.

FIG. 8 shows a further embodiment of a telecommunications network 800. Network 800 provides a system for establishing a call to a wireless directory number (DN) associated with a wireless mobile station 175 wherein the wireless DN is either a non-geographic DN or a non-dialable DN.

A non-geographic directory number, in the embodiment shown in FIG. 8, may be a unique ten-digit number in the same format as a ten-digit North American Numbering Plan (NANP) number, but which has no geographic territory assigned thereto. These non-geographic directory numbers will be allocated specifically for wireless mobile purposes.

A non-dialable directory number is a number that is not provided for as an NANP directory number (e.g., a ten-digit directory number beginning with "011"). The nomenclature "non-dialable" is used herein to describe those numbers that are not used by the NANP to indicate numbering plan area (i.e., area code) or central office code. However the "non-dialable" directory number may be "dialable" in that it may be allowed for use as a prefix for dialing to another country, as a prefix for accessing directory assistance, and so forth.

Administration of non-geographic directory numbers or non-dialable directory numbers in accordance with the invention may be accomplished on a centralized basis, for example, as is currently done for toll free (e.g., "800," "888" and "877") numbers. The meaning of the terms non-geographic directory numbers and non-dialable directory numbers are the same as would be understood by one of ordinary skill in the art.

It bears emphasizing that a key disadvantage of conventional networks is that non-geographic directory numbers have no "home" wireless switching matrix associated therewith. According to conventional teachings, an HLR with its accompanying home wireless switch is where calls to wireless directory numbers are first routed. Non-dialable numbers are not recognized by local switches. Accordingly, non-geographic and non-dialable directory numbers have been unavailable for use in wireless applications.

The embodiment of FIG. 8, according to the invention, enables use of non-geographic and/or non-dialable directory numbers for wireless mobile applications by establishing a novel two-stage dialing process. The caller first dials a preselected geographic-based access number. Next, dialtone is provided, and digits are collected from the caller corresponding to the desired wireless DN. The caller may be a person, or, in another embodiment, may be a modem, programmed to recognize the dialtone so provided and transmit digits in response thereto. The invention improves network capacity and efficiency.

A description of the embodiment of FIG. 8 begins with telecommunications network 800 including a wireline station such as telephone 155, Public Switched Telephone Network (PSTN)/Inter-Exchange Carrier (IXC) 160, an originating switching node 810, a signaling node (SCP) 820, signal transfer point (STP) 235, Home Location Register (HLR) 130, signal transfer point (STP) 135, visitor location register (VLR) 140, visited switching node 150, cell site including antenna 170, and wireless mobile station 175.

HLR 130, VLR 140, visited switching node 150, wireline subscriber stations 155, PSTN/IXC 160, and cellular site including antenna 170 may each comprise conventional apparatus such as that described above in connection with network 200.

STPs 135 and 235 may also comprise conventional apparatus known in the art, as described above.

Originating switching node 810 is located in an end office associated with the preselected access directory number. Originating switching node 810 may be a local serving switch if wireline subscriber station 155 is served directly out of that office. Alternatively, and as also shown in FIG. 8, originating switching node 810 may be accessed from wireline subscriber station 155 through PSTN/IXC 160, which may comprise one or more intermediate offices. Originating switching node 810 is similar to wireline switch 210 inasmuch as it is configured to communicate, upon occurrence of a trigger event, with signaling node 820 when establishing connections for incoming calls. To this extent, the structure of switch 210 illustrated in FIGS. 3 and 4 (and the description associated therewith) applies equally to originating switching node 810. Originating switching node 810, in a preferred embodiment, comprises an Advanced Intelligent Network (AIN)—capable Service Switching Point (SSP), compatible with and at least conforming to AIN release 0.1 (switching node 810 is hereinafter referred to as "SSP 810"). As with switch 210, SSP 810 executes a formal call model, which includes various trigger conditions, as described above with respect to network 200. In accordance with the present invention, SSP 810 is configured with a trigger so as to detect when the preselected geographic access directory number has been dialed, and to thereafter suspend call processing while querying signaling node 820 for further instructions.

The present invention is described in terms of calls originating from a wireline telephone connected to wireline originating switch. However the present invention may be adapted for use at wireless originating switches capable of transmitting and receiving signaling information such as AIN, IS-41, and ANSI-41 messages. As such, calls may originate from a wireless station associated with a wireless originating switch that executes a formal call model which includes the various trigger conditions described herein.

Signaling node 820 is similar to signaling node 220. Therefore, the structure of node 220 illustrated in FIG. 5 (and the description associated therewith) applies equally to signaling node 820. Signaling node 820 interfaces to HLR 130 via STP 235, which routes signaling messages in telecommunications network 800. In a preferred embodiment of network 800, signaling node 820 comprises an AIN—capable Service Control Point (SCP), as described above (signaling node 820 is hereinafter referred to as "SCP 820").

SCP 820, as with SSP 810, has also been programmed to recognize the preselected access directory number. In response thereto, SCP 820 requests that SSP 810 provide dialtone and collect digits (from the caller) corresponding to the desired wireless DN.

In operation, the combination of wireline SSP 810 and SCP 820 implement a novel two-stage dialing process, wherein a geographic access directory number is first dialed, and wherein SSP 810 subsequently collects digits corresponding to the nongeographic or non-dialable wireless directory number.

With continued reference to FIG. 8, a description of the operation will now be set forth. In FIG. 8, the voice path (i.e., the path over which the call is carried) is illustrated as a plurality of links, designated $880_a$-$880_b$. The signaling path, which may comprise a plurality of requests and responses thereto over a number of physical facilities, is designated $830_a$-$830_b$-$830_c$-$830_d$-$830_e$-$830_f$-$8309_g$-$830_h$-$830_i$-$830_j$ (in the order of occurrence).

Wireline telephone 155 initiates a call to SSP 810, where the geographic-based access directory number (DN) resides, by dialing the geographic-based access number. This is done to access a wireless mobile station 175 using a non-geographic or non-dialable directory number. This first link of the connection is shown as a call request 880a in FIG. 8, which is received and processed by SSP 810. Call processing 380 of SSP 810 (best shown in FIG. 3) then determines whether trigger table 384 includes a trigger that matches the dialed, preselected, geographic-based access directory number (i.e., the sequence of digits). As described above, the trigger may include the area code portion thereof, a combination of the area code and an office code portion thereof, or any other specific sequence of digits.

When call processing 380 determines that trigger table 384 does not include any triggers with a matching index, call processing 380 continues with normal call processing. When trigger table 384 includes a trigger with a matching index, however, call processing 380 suspends normal call processing, and invokes the trigger to identify a signaling node (e.g., SCP 820) associated with the dialed access directory number.

Call processing 380 then sends an AIN RouteRequest (info_analyze) message 830a to SCP 820. SCP 820 recognizes the dialed preselected geographic-based access directory number and, in response thereto, directs SSP 810 via an AIN 0.1 message $830_b$, to provide dialtone and collect digits corresponding to the wireless DN. It bears emphasizing that the wireless DN, in accordance with the invention, is one of either a non-geographic DN or non-dialable DN. Thus, while these numbers may not be dialed directly, they nonetheless may be collected for further processing. The collected digits are returned to SCP 820 via an AIN 0.1 message 830.

SCP 820, now in possession of the dialed wireless DN (i.e., the "collected digits"), sends an ANSI-41 LocationRequest $830_d$ to HLR 130, possibly routed by way of one or more STPs, such as STP 235. HLR 130, in response thereto, issues a query to its internal database to determine which visitor location register (VLR) is presently serving mobile wireless station 175. This is done by HLR 130 by identifying a VLR with which the wireless mobile station 175 was last registered. Thus, while there are multiple possible VLRs, only one VLR is identified in response to the query. HLR 130 thereafter transmits a RouteRequest 830e to the identified VLR, such as VLR 140 in FIG. 8, possibly routed by way of one or more STPs, such as STP 135.

VLR 140 determines whether the call is deliverable, and if so, allocates a Temporary Local Directory Number (TLDN) from a pool of numbers whose geographic base is visited cellular wireless switch 150.

VLR 140 returns to HLR 130 the allocated TLDN by a message $820_f$ in response to RouteRequest 830e (a "RouteRequest response" message), possibly routed by way of one or more STPs, such as STP 135.

HLR 130, upon receipt of the RouteRequest response message $830_f$, transmits to SCP 820 a LocationRequest response message $830_g$ that includes the allocated TLDN, possibly routed by way of one of more STPs, such as STP 235.

SCP 820, upon receipt of the LocationRequest response message $830_g$ from HLR 130, transmits an analyze_route message $830_h$ to SSP 810, providing SSP 810 with the TLDN for establishing a call by way of PSTN/IXC 160 to wireless mobile station 175.

SSP 810 is configured to pass the incoming voice connection 880a to PSTN/IXC 160 for delivery to visited cellular switch 150. Using the TLDN, SSP 810 will establish connection $880_b$ to switch 150.

For the voice connections link 880b to be established, switch 150 sends a RouteRequest, designated $830_i$ to VLR 140. RouteRequest $830_i$ includes the TLDN. VLR 140 then associates the allocated TLDN with wireless mobile station 175, and passes the mobile station ID to switch 150 in a message designated $830_j$ in response to RouteRequest $830_i$. Switch 150 is now able to connect the incoming call to wireless mobile station 175 by way of connection $880_b$, via the correct cell site and antenna 170.

FIG. 8 therefore shows a continuous voice path comprising links $880_a$-$880_b$ created dynamically between a geographic-based wireline telephone 155 and a non-geographic-based wireless mobile station 175. Significantly, wireless mobile station 175, having a non-geographic directory number (or non-dialable DN) is accessed using a geographic-based access directory number and wireline/wireless integration to bridge between the two systems. Through the foregoing system and method, telecommunication network 800 exhibits an increased capacity (i.e., can handle more directory numbers) and improved efficiency (i.e., voice connection is established from originating switching node 810 directly to visited wireless switch 150—no need for voice connection through a "home" wireless switch).

Figure 9:
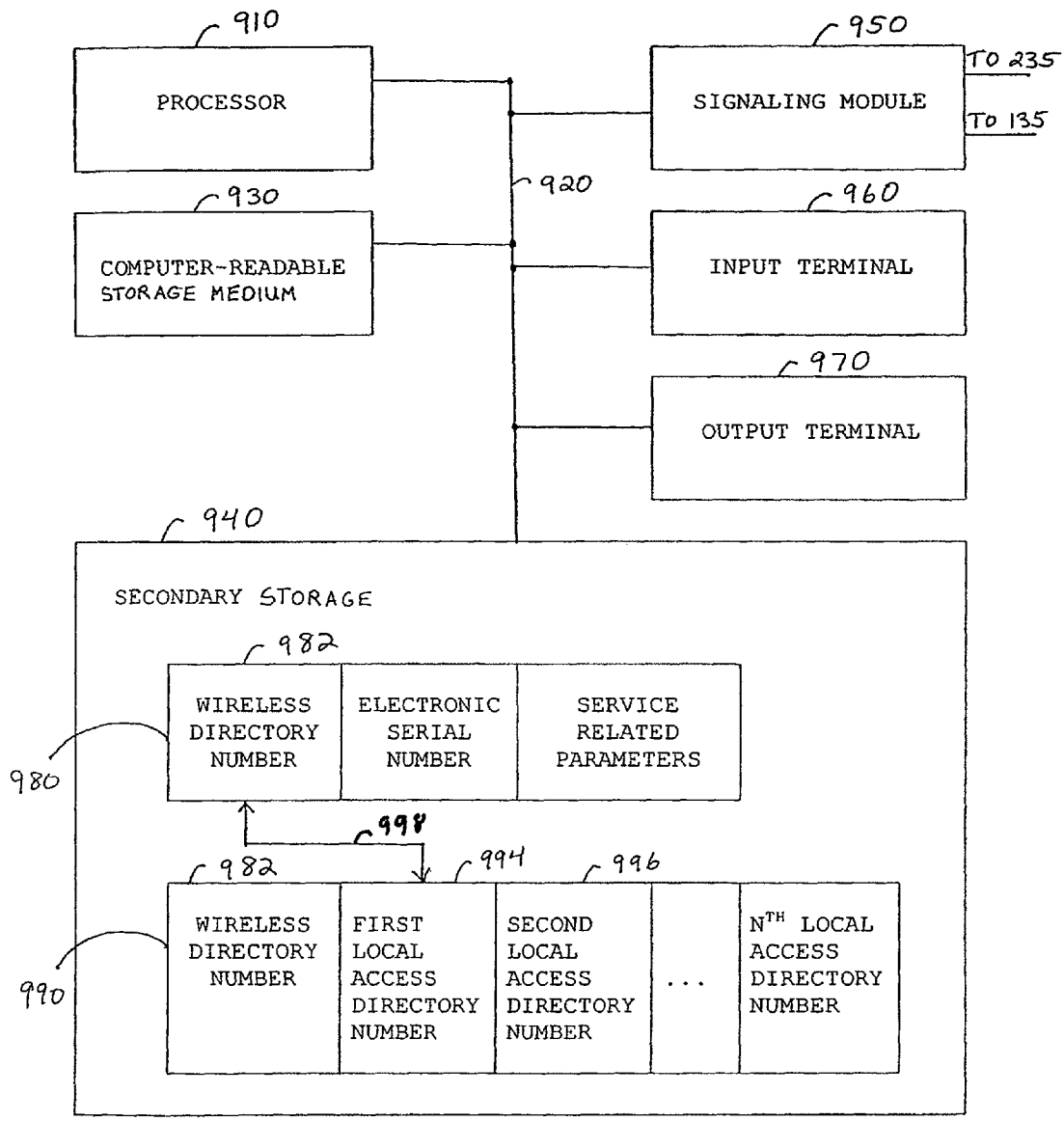
FIG. 9 is a block diagram of a home location register in accordance with an alternative single-stage dialing embodiment consistent with the present invention.

FIG. 9 is a block diagram of home location register 130 in accordance with an alternative dialing process of the embodiment of FIG. 8. As shown, home location register 130 is a system that includes a processor 910, which connects via a bus 920 to a computer-readable storage medium 930, a secondary storage 940, a signaling module 950, an input terminal 960, and an output terminal 970.

Computer-readable storage medium 930 may be a hard disk, a magnetic disk, a compact disk, a personal computer memory card international association (PCMCIA) card, or any other volatile or non-volatile mass storage system readable by processor 910. Executable code is recorded on storage medium 930 for instructing processor 910 to perform operations pertaining to subscriber identification/verification tasks, call set up, and so forth.

Secondary storage 940 may be a hard disk, a magnetic disk, a compact disk, a personal computer memory card international association (PCMCIA) card, or any other volatile or non-volatile mass storage system readable by processor 910. Secondary storage 940 includes a first database 980 and a second database 990. Per convention, first database 980 includes wireless directory numbers, associated with electronic serial numbers, and service related parameters specific to a particular wireless directory number/electronic serial number pair. Only one wireless directory number 982 is shown for clarity of illustration. However, it should be readily understood that first database 980 will include any number of wireless directory numbers 982.

Second database 990 includes wireless directory numbers (DN) 982 associated with local access directory numbers (DN), such as a first local access DN 994 and a second local access DN 996. Local access directory numbers 994 and 996 are unique geographic-based, local access directory numbers maintained at separate originating switching nodes 810, i.e. end offices, of which only one is shown. Wireless DN 982 is associated with first and second local access DNs 994 and 996 in second database 990 prior to call initiation, for example, when a service provider first arranges cellular service parameters for a new subscriber.

Only one wireless DN 982 is shown in second database 990 for clarity of illustration. However, it should be understood that second database 990 will include any number of wireless DNs 982 maintained by HLR system 130. In addition, only two local access directory numbers, i.e., first and second local access DNs 994 and 996, are discussed in connection with wireless DN 982. Ellipsis indicate that wireless DN 982 may be associated with any number of unique geographic-based local access directory numbers.

Signaling interface module 950 transmits to and receives from STP 235 signaling information such as, AIN, IS-41, and ANSI-41 messages. For example, signaling interface module 950 converts signaling information generated by the executable code of computer-readable medium 930 AIN, IS-41 or ANSI-41 messages and transmits the messages to STP 235. Likewise, signaling interface module 950 receives AIN, IS-41 or ANSI-41 messages from STP 135 and converts the messages into an internal format for processing by the executable instructions of computer-readable storage medium 930.

Input terminal 960 may include an input device, such as a keyboard, and output terminal 970 may include a display device.

Referring to FIG. 8 in connection with FIG. 9, a process for establishing a call to a wireless directory number associated with a wireless mobile station 175 according to the alternative embodiment of the present invention will be described. As discussed previously, wireless DN 982 is either a non-geographic DN or a non-dialable DN.

The alternative embodiment of FIG. 9, according to the invention, enables use of non-geographic and/or non-dialable directory numbers for wireless mobile applications. In addition, by utilizing second database 990 at HLR 130, a mobile station 175 assigned wireless DN 982 may be assigned to more than one local calling area by the association of wireless DN 982 with more than one local access directory number, such as first and second local access DNs 994 and 996, respectively.

With continued reference to FIGS. 8 and 9, a description of the operation will now be set forth. In FIG. 8, the voice path (i.e., the path over which the call is carried) is illustrated as a plurality of links, designated $880_a$-$880_b$. The signaling path, which may comprise a plurality of requests and responses thereto over a number of physical facilities, is designated $830_a$-$830_b$-$830_c$-$830_d$-$830_e$-$830_f$-$8309_g$-$830_h$-$830_i$-$830_j$ (in the order of occurrence).

Wireline telephone 155 initiates a call to SSP 810, where the local access directory number DN, for example, first local access DN 984, resides by dialing local access DN 984. This is done to access a wireless mobile station 175 using wireless DN 982 which may be a non-geographic or non-dialable directory number. This first link of the connection is shown as a call request 880a in FIG. 8, which is received and processed by SSP 810.

Call processing 380 of SSP 810 (best shown in FIG. 3) then determines whether trigger table 384 includes a trigger that matches the dialed, first local access DN 984 (i.e., the sequence of digits). As described above, the trigger may include the area code portion thereof, a combination of the area code and an office code portion thereof, or any other specific sequence of digits.

When call processing 380 determines that trigger table 384 does not include any triggers with a matching index, call processing 380 continues with normal call processing. However, when trigger table 384 includes a trigger with a matching index, call processing 380 invokes the trigger to identify a signaling node (e.g., SCP 820) associated with the dialed first local access DN 984.

Call processing 380 then transmits an AIN RouteRequest (info_analyze) message 830a to SCP 820. SCP 820 recognizes the dialed first local access DN 984 and, in response thereto, sends an ANSI-41 LocationRequest $830_d$ to HLR 130, possibly routed by way of one or more STPs, such as STP 235.

In response to receipt of LocationRequest $830_d$, processor 910 of HLR 130 accesses second database 990 to obtain wireless DN 982 associated with the dialed first local access DN 994. It bears emphasizing that wireless DN 982, in accordance with the alternative embodiment of the present invention, is one of either a non-geographic DN or non-dialable DN. Thus, while these numbers may not be dialed directly, they nonetheless may be obtained from second database 990 and may be utilized for further processing.

When HLR 130 obtains wireless DN 982 associated with the dialed first local access DN 984, HLR 130 associates the call initiated at telephone 155 with wireless directory number 982 by employing a pointer 998 between first local access DN 994 of second database 990 to wireless DN 982 of first database 980.

HLR 130 then issues a query to first database 980 to determine which visitor location register (VLR) is presently serving mobile wireless station 175 having wireless directory number 982. This is done by HLR 130 by identifying a VLR with which the wireless mobile station 175 was last registered. Thus, while there are multiple possible VLRs, only one VLR is identified in response to the query.

HLR 130 thereafter sends a RouteRequest $830_e$ to the identified VLR, such as VLR 140 in FIG. 8, possibly routed by way of one or more STPs, such as STP 135 utilizing wireless directory number 982 obtained from second database 990.

VLR 140 determines whether the call is deliverable, and if so, allocates a Temporary Local Directory Number (TLDN) from a pool of numbers whose geographic base is visited cellular wireless switch 150.

VLR 140 returns to HLR 130 the allocated TLDN by a message $830_f$ in response to RouteRequest $830e$ (a "RouteRequest response" message), possibly routed by way of one or more STPs, such as STP 135 using wireless DN 982.

HLR 130, upon receipt of the RouteRequest response message $830_f$, accesses second database 990 using pointer 998 to recover first local access directory number 994 and associate first local access directory number 994 with the TLDN. HLR 130 then forwards the TLDN to SCP 820 by transmitting a LocationRequest response message $830^-_g$ that includes the allocated TLDN, possibly routed by way of one or more STPs, such as STP 235, using first local access DN 994.

Upon receipt of the LocationRequest response message $830_g$ from HLR 130, SCP 820 relays the TLDN to SSP 810. SCP 820 transmits an analyze_route message $830_h$ to SSP 810, providing SSP 810 with the TLDN for establishing a call by way of PSTN/IXC 160 to wireless mobile station 175.

SSP 810 is configured to pass the incoming voice connection 880a to PSTN/IXC 160 for delivery to visited cellular switch 150. Using the TLDN, SSP 810 will establish connection $880_b$ to switch 150.

For the voice connections link 880b to be established, switch 150 sends a RouteRequest, designated $830_i$ to VLR 140. RouteRequest $830_i$ includes the TLDN. VLR 140 then associates the allocated TLDN with wireless mobile station 175, and passes the mobile station ID to switch 150 in a message designated $830_j$ in response to RouteRequest $830_i$. Switch 150 is now able to connect the incoming call to wireless mobile station 175 by way of connection $880_b$, via the correct cell site and antenna 170.

FIG. 8 therefore shows a continuous voice path comprising links $880_a$-$880_b$ created dynamically between a geographic-based wireline telephone 155 and a non-geographic-based wireless mobile station 175. Significantly, wireless mobile station 175, having a non-geographic directory number (or non-dialable DN) is accessed using a geographic-based local access directory number and wireline/wireless integration to bridge between the two systems. Through the alternative embodiment of the present invention described in connection with FIGS. 8 and 9, telecommunication network 800 exhibits the benefits of an increased capacity and improved efficiency as discussed in connection with the two-stage call processing methodology.

Moreover, the implementation of the alternative embodiment of HLR 130 shown in FIG. 9 results in second database 990 matching local access directory numbers with the non-geographic directory number (or non-dialable DN) of the mobile station in HLR 130. Thus, there may be multiple originating switches 810, or end offices, each associated with unique local access directory numbers, and each associated with the same non-geographic or non-dialable directory number in HLR 130. Such call processing implementation advantageously allows local access from more than one local calling area for that mobile station.

The call processing operations of FIGS. 8 and 9 are described in terms of the wireless mobile station having a wireless directory number that is one of a non-geographic DN and a non-dialable DN. However, it should be understood that the principals of the present invention could be utilized as well for a wireless mobile station having a geographic-based wireless directory number.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of a wireline switch and signaling node have been described, one skilled in the art will appreciate that a wireline switch and signaling node suitable for use with methods and systems consistent with the present invention may contain additional or different components.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method comprising:
   receiving, by a signaling module or an input terminal of a home node, a request from a signaling node, the signaling node having been identified based upon a first number associated with a wireless device, where receiving the request comprises receiving a second number associated with the wireless device;
   requesting, by the signaling module or an output terminal of the home node, and in response to the received request, a route to the wireless device from a visiting node with which the wireless device was last registered;
   receiving, by the signaling module or the input terminal of the home node, a temporary number from the visiting node, where the temporary number is associated with a visited wireless switch serving the wireless device; and
   sending, by the signaling module or the output terminal of the home node, the temporary number to the signaling node.

2. The method of claim 1, further comprising:
   receiving the first number at an originating switching node;
   sending a routing request to the signaling node, the routing request including the first number;
   receiving the temporary number from the home node; and
   establishing a communication between the originating switching node and the wireless device via the visited wireless switch using the temporary number.

3. The method of claim 2, where the originating switching node includes an Advanced Intelligent Network (AIN)-capable Service Switching Point (SSP), the signaling node comprises an AIN-capable Service Control Point (SCP), and the home node is a home location register (HLR).

4. The method of claim 2 where sending the routing request includes invoking a trigger at the originating switching node indexed as a function of the first number.

5. The method of claim 1, where requesting the route includes accessing a database at the home node to identify the visiting node with which the wireless device was last registered.

6. The method of claim 1, where the temporary number allows the wireless device to be contacted without contacting a home switching node associated with the wireless device.

7. A system comprising:

a home node to:

receive a request from a signaling node, the signaling node having been identified by a first number associated with a wireless device, where receiving the request comprises receiving a second number associated with the wireless device;

request a route to the wireless device from a visiting node with which the wireless device was last registered;

receive, from the visiting node, a temporary number associated with a visited wireless switch serving the wireless device; and send the temporary number to the signaling node.

8. The system of claim 7, where when requesting the route, the home node is further to access a database to identify the visiting node with which the wireless device was last registered.

9. The system of claim 7, where the temporary number allows the wireless device to be contacted without contacting a home switching node associated with the wireless device.

10. A device comprising:

a processor; and a memory containing instructions, that when executed by the processor, cause the processor to:

receive a request that includes a first number associated with a wireless device from a signaling node, the signaling node having been identified by a second number associated with the wireless device;

request a route to the wireless device from a visiting node with which the wireless device was last registered;

receive, from the visiting node, a temporary number associated with a visited wireless switch serving the wireless device; and send the temporary number to the signaling node.

11. The device of claim 10, where the memory further contains instructions, that when executed by the processor, cause the processor to:

when requesting the route, access a database to identify the visiting node with which the wireless device was last registered.

12. The device of claim 10, where the temporary number allows the wireless device to be contacted without contacting a home switching node associated with the wireless device.

* * * * *